No. 639,202. Patented Dec. 12, 1899.
W. R. STEARNS.
SIGNALING SYSTEM AND APPARATUS FOR ELECTRIC TROLLEY RAILWAYS.
(Application filed July 30, 1898.)
(No Model.) 4 Sheets—Sheet I.

Witnesses
Inventor
Wesley R. Stearns
By ................
Attorney.

No. 639,202. Patented Dec. 12, 1899.
W. R. STEARNS.
SIGNALING SYSTEM AND APPARATUS FOR ELECTRIC TROLLEY RAILWAYS.
(Application filed July 30, 1898.)
(No Model.) 4 Sheets—Sheet 2.
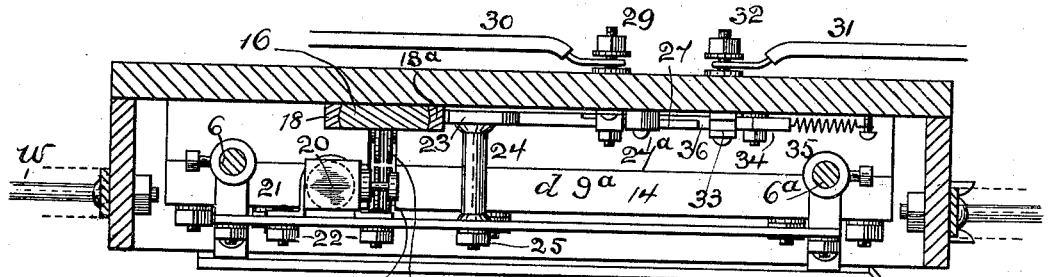
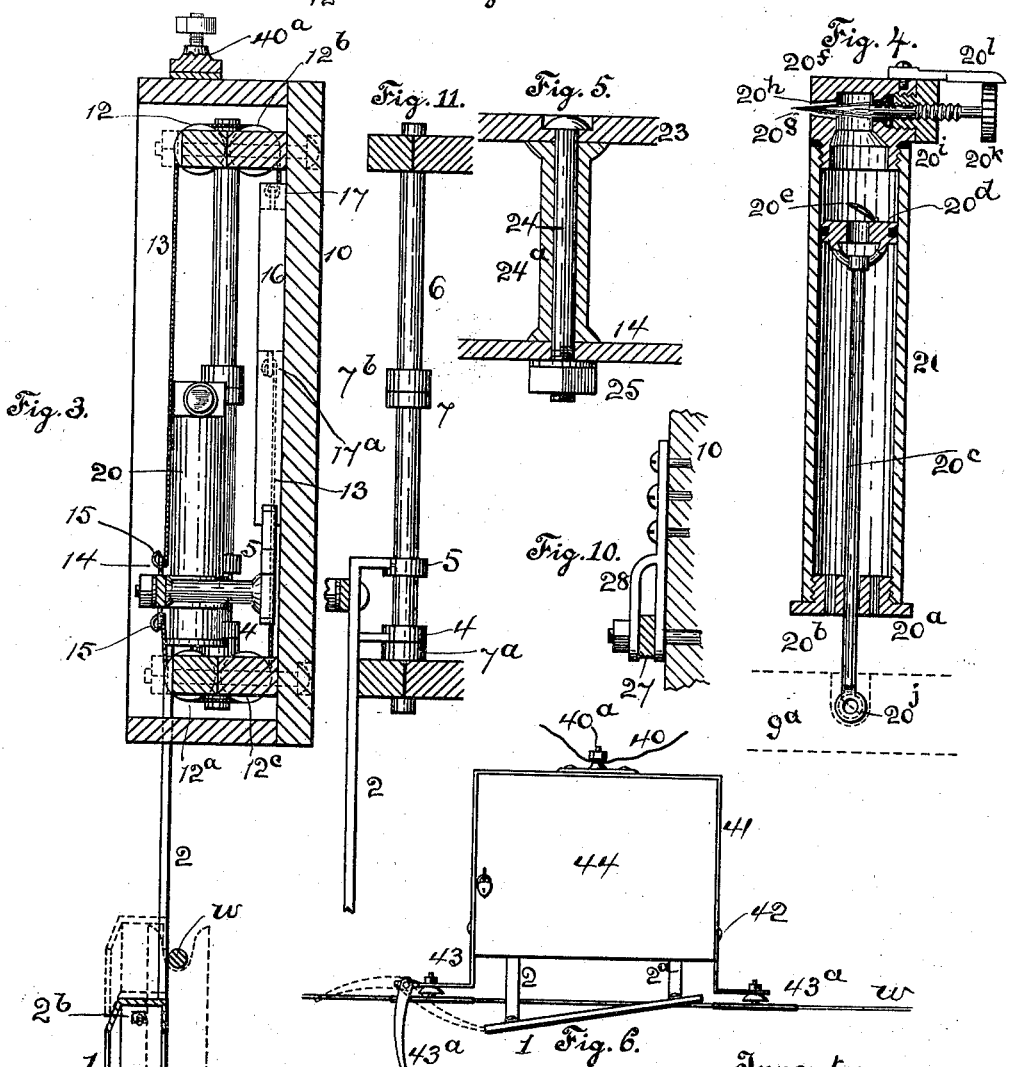

No. 639,202. Patented Dec. 12, 1899.
W. R. STEARNS.
SIGNALING SYSTEM AND APPARATUS FOR ELECTRIC TROLLEY RAILWAYS.
(Application filed July 30, 1898.)
(No Model.) 4 Sheets—Sheet 3.

Witnesses:
A. I. Dygert
H. J. Axer

Inventor,
Wesley R. Stearns
By T. J. Geisler
Attorney.

No. 639,202.  
W. R. STEARNS.  
SIGNALING SYSTEM AND APPARATUS FOR ELECTRIC TROLLEY RAILWAYS.  
(Application filed July 30, 1898.)  
(No Model.)  
Patented Dec. 12, 1899.  
4 Sheets—Sheet 4.

Witnesses  
Inventor.  
Wesley R. Stearns  
By       Attorney.

UNITED STATES PATENT OFFICE.

WESLEY R. STEARNS, OF PORTLAND, OREGON, ASSIGNOR OF ONE-THIRD TO WILLIAM DENT, OF SAME PLACE.

SIGNALING SYSTEM AND APPARATUS FOR ELECTRIC TROLLEY-RAILWAYS.

SPECIFICATION forming part of Letters Patent No. 639,202, dated December 12, 1899.

Application filed July 30, 1898. Serial No. 687,374. (No model.)

*To all whom it may concern:*

Be it known that I, WESLEY R. STEARNS, a citizen of the United States of America, and a resident of the city of Portland, in the county of Multnomah and State of Oregon, have invented certain new and useful Improvements in Signaling Systems and Apparatus for Electric Trolley-Railways, of which the following is a specification, reference being had to the accompanying drawings as a part thereof.

My invention relates to automatic electric signaling systems and apparatus used in connection with electric trolley-railways generally, but especially with single-track roads, in which cars traveling in opposite directions pass each other at switches or sidings on which one of the cars is run to allow the other to pass. These switches or sidings are usually so far apart or so situated that the motorman of either car is unable to see the other to guide him as to whether he shall wait on the switch or proceed, and hence automatic signals have been employed to control the movements of the car.

The object of my invention is to obtain a reliable automatic signaling system and device of simple construction, the same to be automatically operated by the trolley of the car as it runs on the wire. The construction and operation of my device will be easily understood from the accompanying drawings, in which—

Figure 1:
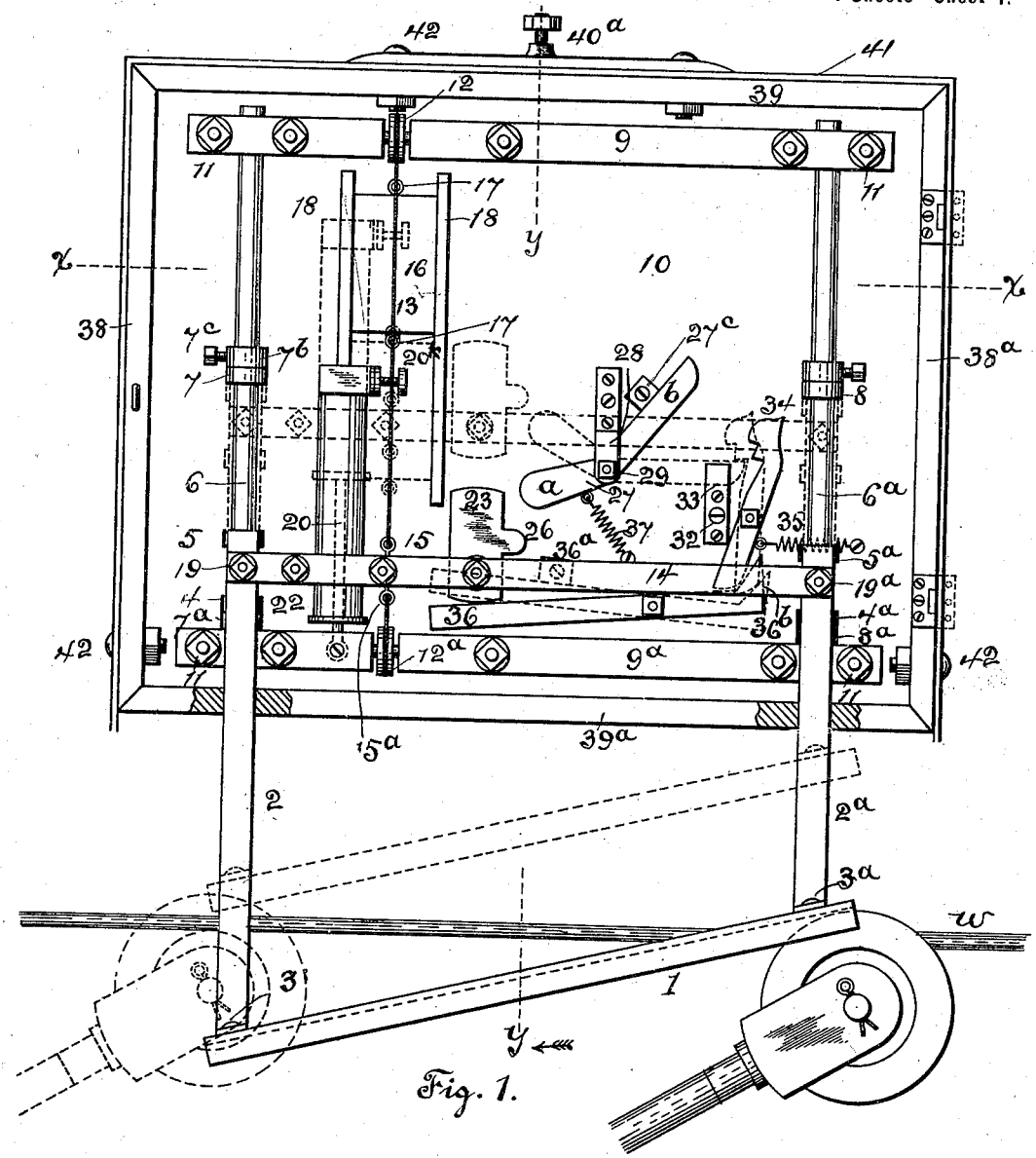
Figure 12:
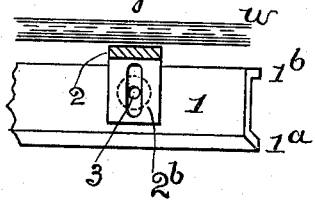
Figure 7:
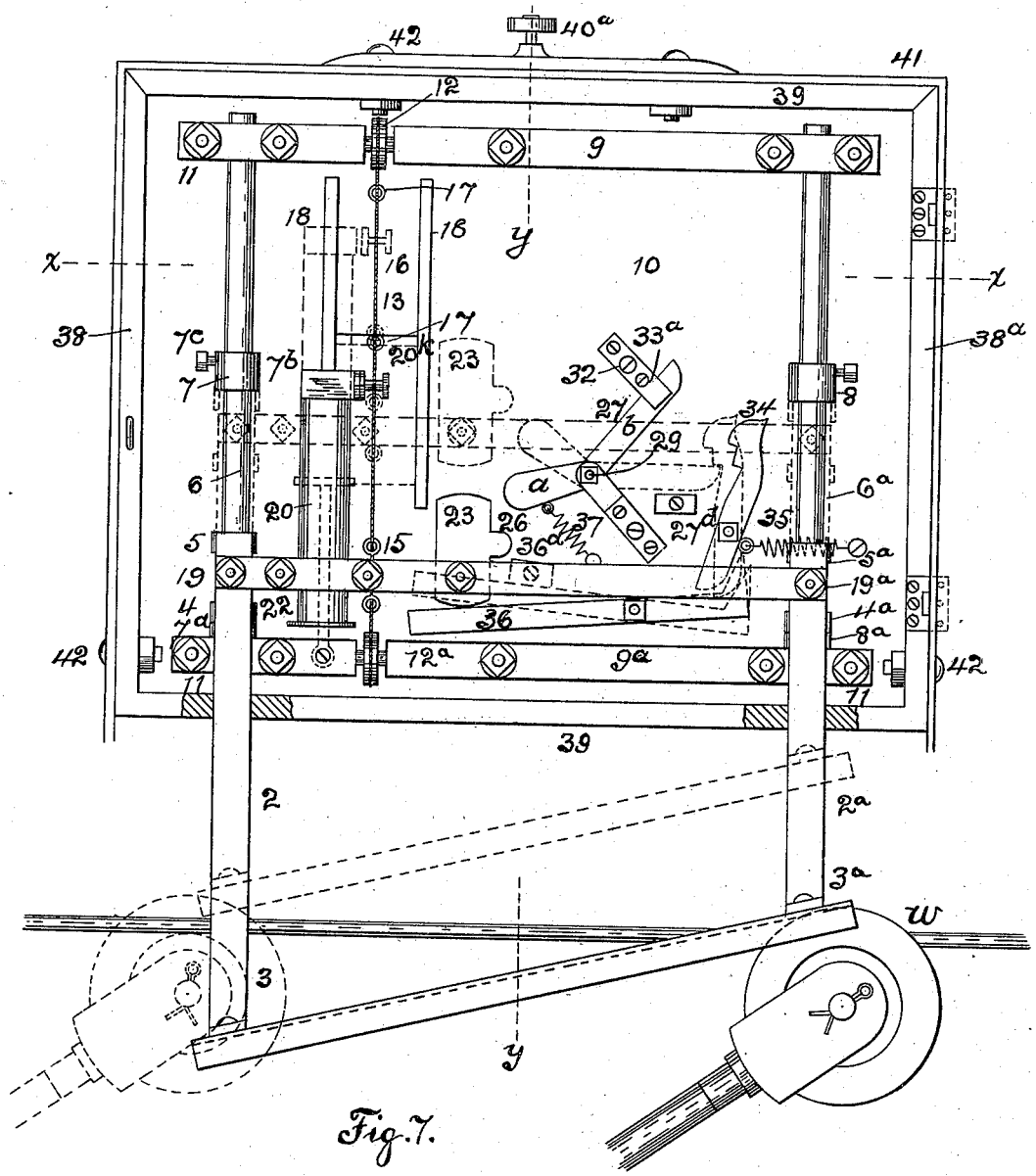
Figure 8:
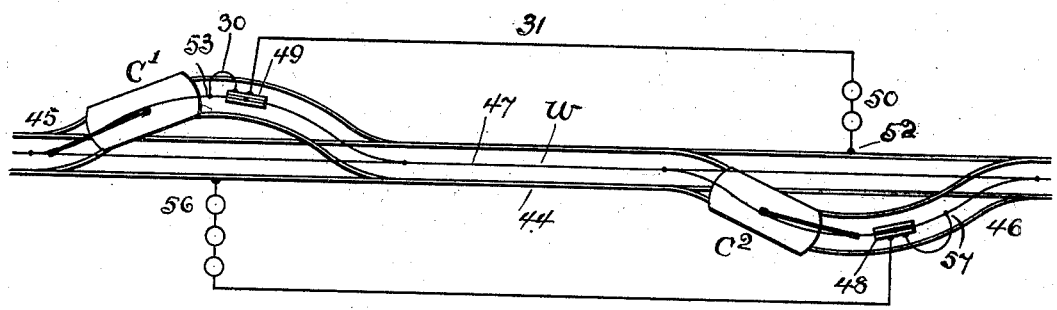
Figure 9:
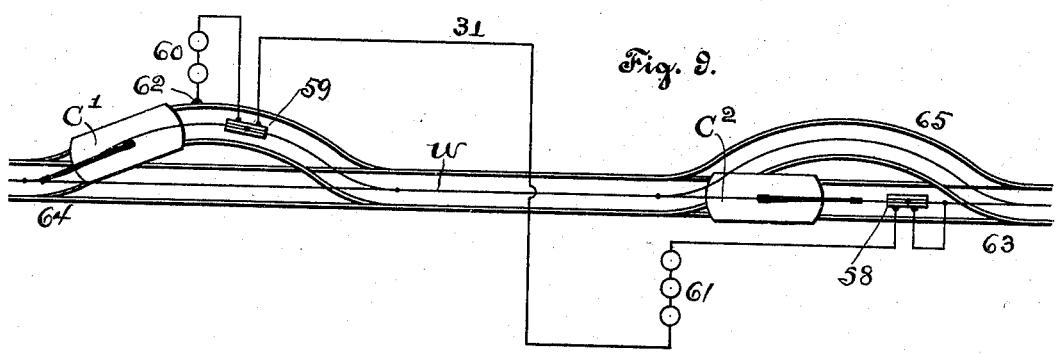

Figure 1 is a front elevation of my device to be secured in position above the trolley-wire, as illustrated in Fig. 6, and also shows the manner in which the same is put in operation by the trolley-wheel when passing beneath it. Fig. 2 is a plan section through the line $x\,x$ of Fig. 1. Fig. 3 is a vertical transverse section through the line $y\,y$ of Fig. 1 looking to the left. Fig. 4 is a longitudinal section of the pneumatic suspension device 20. Fig. 5 is a detail of construction, to be explained hereinafter. Fig. 6 illustrates a case in which my device is inclosed and the manner in which the same is suspended above and secured to the trolley-wire. Fig. 7 shows a modification in the construction of my device, so as to adapt the same for use in a single-wire signaling system, as illustrated in the diagrammatical view, Fig. 9. Fig. 8 is a diagrammatic representation of my invention used in connection with a two-wire signaling system. Fig. 9 is a diagrammatic representation of my device applied to a single-wire signaling system. Figs. 10 and 11 are further details of construction, to be hereinafter more fully described; and Fig. 12 is a partial plan section showing the relative position of the truss with respect to the trolley-wire.

Referring now to the letters and numerals, 1 is a slanting truss or bar provided with dependent flanges $1^a$ and $1^b$ on its under face, constituting a groove for receiving one of the flanges of the trolley-wheel while such wheel is passing beneath and operating my device by lifting the said truss, as shown in Figs. 1 and 3. Such truss is secured to the lower ends of the two depending arms $2\,2^a$. For this purpose and to allow for lateral adjustment the said arms are provided at their lower extremities with slotted lugs or ears $2^b$, projecting horizontally, and the parts are united by screw-bolts $3\,3^a$. (See Figs. 1, 3, and 12.) Each of the upper ends of the arms $2\,2^a$ is provided with two laterally-projecting perforated lugs or collars 4 5 and $4^a\,5^a$, whereby said arms are movably mounted on the guide-rods $6\,6^a$, as illustrated in Fig. 11.

$7\,7^a\,8\,8^a$ are rubber washers for the collars 4 5 and $4^a\,5^a$ to strike against in lifting and falling, the upper washers being affixed to and vertically adjustable with the loose collars $7^b$, secured in place by means of the set-screw $7^c$. As a convenience of construction, the wooden cleats $9\,9^a$ are each divided longitudinally into two pieces, as shown at Fig. 2, and provided with vertical grooves near their extremities in their opposed faces in which to clamp the ends of said guide-rods $6\,6^a$, as shown in Fig. 11. The cleats are rigidly fastened to the backboard 10 by means of bolts and nuts 11. Near the respective left-hand ends of said cleats a transverse recess is formed of sufficient width to have mounted therein a pair of small grooved pulleys 12 $12^b$ and $12^a\,12^c$. (See Figs. 1, 2, and 3.) Passing over these pulleys is a cord or chain 13, the front ends of which are secured to screw-eyes 15 $15^a$ on the brace 14, rigidly secured at its ends to the upper ends of the arms $2\,2^a$ by means of bolts 19 $19^a$, and the rear ends of such cord are secured to screw-eyes 17 17ª on the counterweight 16. The counterweight is adapted to slide up and down between the concaved or otherwise grooved inner faces of the cleats 18, and is designed to balance the parts to be lifted by the trolley to operate more easily. It has been found by me, however, in the practical use of my invention that the balancing-weight and its coöperating devices are not essential, as the trolley-wheel in passing beneath the signaling apparatus will readily operate the same. The use of such counterbalance may therefore be dispensed with if deemed preferable. To such brace 14 is affixed the automatic suspension device 20 by means of a strap 21 and bolts 22. (See Fig. 2.)

23 is a trip-block made of hard rubber and rigidly fastened to said brace by a bolt 24 and nut 25, a sleeve 24ª with flaring ends being placed between such brace and block, as shown in enlarged detail in Fig. 5. The trip-block 23 is provided with a lip or projection 26, which is adapted in moving upward to engage and lift the short arm $a$ of the knife-switch 27, which is pivotally mounted on the bolt 29, extending through the dependent flange of the bracket 28 and the backboard 10, to which such bracket is affixed, as illustrated in the detail Fig. 10. The knife-switch 27 is electrically connected through the bolt 29 and the insulated conductor 30 with the trolley-wire W.

The switch-socket 33 is electrically connected through the screw-bolt 32 and the insulated conductor 31 with the track. The spring-notched lever 34, pivotally mounted on the backboard 10, serves to engage the long arm $b$ or the knife-switch 27 when such arm descends by reason of the trip-block 23 lifting the arm $a$, and the lever 34 is disengaged from said arm $b$ by the trip-block 23 returning to its normal position and depressing the long end of the lever 36, pivoted to the backboard 10 and provided with a beveled toe 36$^b$, which as the short end of the said lever 36 is lifted presses against the rounded base of the lever 34, pulling the upper end of such lever out of engagement with the arm $b$. The coil-spring 35 restores the lever 34 in position to catch the said arm $b$ again upon the lever 36 being released by the lifting of the trip-block 23. When the long end of the lever 36 is released by the lifting of the trip-block and the short end is depressed by the base of the spring-controlled lever 34 bearing against the toe 36$^b$, the long end strikes the stop 36$^a$.

37 is a coiled spring whose function is to quickly break the electrical circuit by throwing the arm $b$ of the knife-switch 27 out of the switch-socket 33 as soon as released by the notched lever 34. The arm $b$ of the knife-switch when released strikes a stop 27$^c$. The backboard 10, together with the sides 38 38$^a$, the top and bottom pieces 39 39$^a$, (shown in Fig. 1,) and a door 44, (seen in Fig. 6,) constitute a closed case for the above-described mechanism. The whole is suspended above the trolley-wire by means of a guy-wire 40, which is secured at its middle to the hanger 40$^a$ and by its sides to poles on each side of the track similar to the manner in which the trolley-wire is supported. To retain the case containing the signaling mechanism in place on the trolley-wire W, an iron strap 41 is fastened to said case by means of bolts 42 and the ends of such strap attached to hangers 43 43$^a$.

The function of the adjustable pneumatic suspending device 20 is to maintain the electric current for a sufficient period of time to allow for a car to travel over the distance separating one siding from the other. In its construction it comprises a cylinder or tube 20, both ends of which have an inner thread, and in the lower end is a threaded head 20$^a$, having a series of air-apertures 20$^b$ and a central opening for the piston-rod 20$^c$ of the piston 20$^d$, the latter having a disk valve 20$^e$. The upper end of the cylinder has affixed therein a chambered threaded head 20$^f$, in which is a conical air aperture or outlet 20$^h$, in which adjusts a conical valve 20$^g$, the stem of such valve being provided with micrometer-thread, so as to admit of minute adjustment in the gland 20$^i$, which is provided with a corresponding inner thread. The head 20$^k$ at the end of the stem of the valve 20$^g$ has peripheral graduations, and a knife-edged bar 20$^l$ is provided to assist it in the minute adjustment of the orifice for the air-escape. The end of the piston-rod has an eye 20$^j$, whereby the same is attached by a screw to the outer face of the cleat 9$^a$. Thus with each lift of the truss the cylinder 20 is also raised about the piston 20$^d$, giving the latter a relative movement and filling the space back of the same with air taken in through the apertures 20$^b$ and disk valve 20$^e$, and upon the truss being released again the lifting devices can fall no more rapidly than the interval of time it takes for the air to escape through the aperture 20$^h$, as controlled—i. e., enlarged or reduced—by the valve 20$^g$.

The electric current established and interrupted by means of my device is to be employed for giving the automatic signals at the switch-station ahead of the car, such signals being either by lamps or alarms.

The operation of my device and system is as illustrated in the diagrammatic view, Fig. 8. In this 44 designates the main track, and 45 and 46 switches and sidings therefrom over which extends the trolley-wire W and its branches. At each of said switches I have installed one of my signaling devices, (designated by 48 and 49 of the construction described.)

Referring to the signals governing an east-end track-section, the electric conductor 30 is connected with the trolley-wire at terminal 53 and with the signaling device 49, and the electric conductor 31 is connected to said signaling device and with the lamp 50 in series and finally with the track at terminal 52. The arrangement for governing a west-end track-section is a duplicate of that just described. The main track is supposed to be so arranged that the car traveling east runs on the north siding and the car traveling west runs on the south siding. As the car C² traveling west runs on the siding 46 it operates the device 48, closing the circuit and lighting the lamps 56, the pneumatic suspension device being so adjusted that it will maintain a closed circuit for an interval of time sufficient to allow the car C² to travel past the siding 45. The car C', noticing that the signal-lamps 56 are lighted, will wait on the siding 45 for the car C² to pass. As soon as the car C² has passed the siding 45 C' proceeds eastward, operating the signal device 49, closing the circuit, and lighting the lamps 50, as described, and warning the third car traveling west of its approach. In each lamp-circuit sufficient resistance must be included to adapt the strength of the current to that required by the lamps.

Fig. 9 illustrates, diagrammatically, how my device may be used with a single wire or circuit conductor. In order that my signaling device may so operate, the construction of one of the two signaling devices installed at the opposite ends of a stretch or section of track must be modified in parts, as shown in Fig. 7. There is no great difference between the construction of this device and the one already described; but in this case the position of the switch-socket 33, as shown in Fig. 1, is moved to that of 33ᵃ, so that the knife-switch 27 will normally lie in it, allowing the current to pass between the terminals 29 and 32, being the bolts through which the knife-switch and socket are electrically connected with the conductors. (See Figs. 1 and 2.) 27ᵈ is a stop substituted for the stop 27ᶜ. (Seen in Fig. 1.) In other respects the apparatus is constructed and operated as already described. With such arrangement the effect of the trolley-wheel lifting against the truss 1 would be to bring the trip-block 23 against the short arm of the knife-switch 27, throwing the same out of engagement with the socket 33ᵃ and interrupting the current. The same operation would lift the cylinder 20 and the parts therewith connected, freeing the lever 36 and place notched spring-controlled lever 34 in condition to catch the lower end of the knife-switch 27 and hold the circuit open until the air drawn into the cylinder back of the piston therein has had an opportunity of escaping, allowing the cylinder and parts therewith connected to descend again and causing the trip-block 23 to strike the lever 36, operating the lever 34 and releasing the knife-switch 27 to reëstablish the circuit. It is obvious that the same modified device as last described may also be used with a two-wire system. It is also evident that the means for holding the circuit making and breaking device in the position given the same by being operated by the trip for the interval required to allow the air drawn into the cylinder back of the piston to escape again may operate independent of the sliding frame—that is to say, the up movement of the frame merely operating the trip, but not controlling said holding means, which could be controlled directly by the pneumatic device. Supposing a signaling apparatus of said modified structure (illustrated in Fig. 7) to be installed at 59 and that a signaling device of the type illustrated in Fig. 1 is installed at 58 and that the signal-lamps 60 and 61 and said signaling devices are all connected up in series, the following conditions would exist: The devices at 58 and 59 being in their normal state, car C² in passing siding 65 may close the circuit, provided that car C' has not passed siding 64. Consequently car C² in passing signaling device 58, observing that signal-lamps 61 light up, knows that the main line is clear between switches 65 and 64 and proceeds. Car C', just approaching switch 64, observes signal 60 lighted up, and therefore waits for car C² to pass. If car C² after having passed signaling device 68 notices that the lamp 61 failed to light up, it is an indication that C' has passed switch 64, and hence waits for car C² at switch 65. If car C' observes upon entering switch 64 that signal-lamps 60 are not lighted up, it is informed the track is clear as far as switch 65 and may proceed. The pivoted finger 43ᵃ, dependent from the hanger 43, is provided to facilitate the running of the trolley-wheel on the truss 1.

I am aware that electrical signaling devices operated by the wheel of the trolley have heretofore been used; but in the construction thereof the operating member would enter the groove in the wheel of the trolley and, filling such groove for the time being, would cause the wheel to leave the trolley-wire, and there was a tendency of the trolley-wheel being thrown off the trolley-wire, especially when the car is moving rapidly along, and then, again, because of the wearing away of the surface of the groove in the wheel and the consequential deepening of such groove there would be considerable difference in the manner of its contact with the operating device. In my invention the trolley-wheel runs along the trolley-wire continuously, never leaving the same for a moment because of any interference therewith of any part of my device. One of the flanges of the trolley-wheel alone strikes and lifts against the truss 1, and the flanges 1ᵃ 1ᵇ thereof keep the same on the lifting-flange of the trolley-wheel. There is nothing to throw the wheel off the wire in my device, and the diagonal position of the truss makes the lifting gradual and steady, no matter how rapidly the car is traveling, and the construction of my device is also such that it will operate perfectly with either a new or old—i. e., worn—wheel. In this respect my device is also an improvement of other devices of like character to be operated by the trolley-wheel, for in them the wearing away of the trolley-wheel would have a tendency to interfere with the successful working of the device, while my device is especially designed to allow for such wear.

Now, what I claim, and desire to secure by Letters Patent, is—

1. In an electric signaling system for trolley-railways the combination of a casing suspended from the trolley-wire, a frame movably supported in such casing so as to have an up-and-down movement, the base of said frame carrying a diagonal truss, as 1, having dependent flanges, forming between them a groove for receiving one of the flanges of a trolley-wheel traveling along the trolley-wire under the said truss, a pneumatic device connected with the said casing and frame respectively and operated by the lift of the frame so as to fill with air and suspend the frame on the air-cushion so formed for the time required for the imprisoned air to escape again through a valve-controlled aperture for such purpose provided, electric signals and circuit making and breaking device electrically connected with the circuit operating said signals, a trip carried by the frame adapted to operate the circuit making and breaking device on the lifting of said frame, and means controlled by said pneumatic device for retaining the circuit making and breaking device in the position given the same by being operated by said trip for about the interval required for the air admitted into the pneumatic device to escape again, substantially as set forth.

2. In an electric signaling apparatus for trolley-railways, the combination of a casing, a frame movably supported in such casing so as to have an up-and-down movement, the base of said frame carrying a diagonal truss, as 1, having dependent flanges forming between them a groove for receiving one of the flanges of a trolley-wheel, a pneumatic device connected with the said casing and frame respectively and operated by the lift of the frame so as to fill with air and suspend the frame on the air-cushion so formed for the time required for the imprisoned air to escape again through a valve-controlled aperture for such purpose provided, a circuit making and breaking device adapted to be electrically connected with the circuit operating the signals, a trip carried by the movable frame and adapted to operate the circuit making and breaking device on the lifting of said frame, and means controlled by said pneumatic device for retaining the circuit making and breaking device in the position given the same by being operated by said trip for about the interval required for the air admitted into the pneumatic device to escape again, substantially as set forth.

3. In an electric signaling apparatus for trolley-railways, the combination of a casing, a frame movably supported in said casing so as to have an up-and-down movement, the base of said frame carrying a diagonal truss, as 1, having dependent flanges forming between them a groove for receiving one of the flanges of a trolley-wheel, a pneumatic device comprising a cylinder and piston therein respectively connected with the said casing and movable frame, the piston having a valve, and the cylinder an aperture for admitting air in front of the piston and a valve-controlled aperture for releasing again the air admitted behind the piston, a circuit making and breaking device adapted to be electrically connected with the circuit operating signals, a trip carried by the movable frame and adapted to operate the circuit making and breaking device on the lifting of said frame, and means controlled by said pneumatic device for retaining the circuit making and breaking device in the position given the same by being operated by said trip for about the interval required for the air admitted back of the piston to escape again, substantially as set forth.

4. In an electric signaling apparatus for trolley-railways, the combination of a casing provided with vertical guides, a frame movably supported in said guides so as to have an up-and-down movement, the base of said frame carrying a diagonal truss, as 1, having dependent flanges forming between them a groove for receiving one of the flanges of a trolley-wheel, a pneumatic device comprising a cylinder and piston therein respectively connected with the said casing and movable frame, the piston having a valve, and the cylinder an aperture for admitting air in front of the piston and a valve-controlled aperture for releasing again the air admitted behind the piston, a spring-controlled knife-switch, and a socket for receiving such knife-switch, the same being adapted to be electrically connected with the poles of the circuit operating the signals, a trip carried by the movable frame and adapted to operate the knife-switch on the lifting of said frame, and means controlled by said pneumatic device for retaining said switch in the position given the same by being operated by said trip for about the interval required for the air admitted back of the piston to escape again, substantially as set forth.

5. In an electric signaling apparatus for trolley-railways, the combination of a casing provided with vertical guides, a frame movably supported in said guides so as to have an up-and-down movement, the base of said frame carrying a diagonal truss, as 1, having dependent flanges forming between them a groove for receiving one of the flanges of a trolley-wheel, a pneumatic device comprising a cylinder and piston therein respectively connected with the said casing and movable frame, the piston having a valve, and the cylinder an aperture for admitting air in front of the piston and a valve-controlled aperture for releasing again the air admitted behind the piston, a spring-controlled knife-switch, and a socket for receiving such knife-switch, the same being adapted to be electrically connected with the poles of the circuit operating the signals, a trip carried by the movable frame and adapted to operate the knife-switch on the lifting of said frame, a spring-controlled catch as 34, for retaining the said switch in the position given the same by being operated by said trip on the frame, a lever as 36 coöperating with said catch 34 and trip and adapted to release said catch upon the return of said trip to its normal position, substantially as set forth.

Signed by me at the city of Portland, county of Multnomah, State of Oregon, this 20th day of April, 1898.

WESLEY R. STEARNS.

Witnesses:
  A. CALEY,
  T. J. GEISLER.